(12) United States Patent
Al-Khaldi

(10) Patent No.: US 8,927,467 B2
(45) Date of Patent: Jan. 6, 2015

(54) METHOD FOR PREVENTING CALCIUM CITRATE PRECIPITATION DURING CITRIC ACID ACIDIZING TREATMENTS

(75) Inventor: Mohammed H. Al-Khaldi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 435 days.

(21) Appl. No.: 12/966,348

(22) Filed: Dec. 13, 2010

(65) Prior Publication Data

US 2012/0149607 A1 Jun. 14, 2012

(51) Int. Cl.
| | |
|---|---|
| *C09K 8/528* | (2006.01) |
| *C09K 8/52* | (2006.01) |
| *C09K 8/78* | (2006.01) |
| C08K 5/092 | (2006.01) |
| C08K 5/17 | (2006.01) |

(52) U.S. Cl.
CPC . *C09K 8/78* (2013.01); *C08K 5/092* (2013.01); *C08K 5/175* (2013.01)
USPC ............................................. 507/241; 507/90

(58) Field of Classification Search
CPC .......... C09K 8/528; C09K 8/52; C09K 8/524; C02F 5/12
USPC ................................................. 507/241, 90
See application file for complete search history.

(56) References Cited

U.S. PATENT DOCUMENTS

| | | |
|---|---|---|
| 3,116,105 A | 12/1963 | Kerst |
| 4,151,098 A | 4/1979 | Dill et al. |
| 4,167,214 A | 9/1979 | Street, Jr. |
| 4,351,673 A | 9/1982 | Lawson |
| 4,708,805 A * | 11/1987 | D'Muhala ..................... 210/698 |
| 5,183,573 A | 2/1993 | Kreh et al. |
| 5,293,942 A | 3/1994 | Gewanter et al. |
| 5,468,303 A | 11/1995 | Thomas, Sr. |
| 7,192,908 B2 | 3/2007 | Frenier et al. |
| 7,427,584 B2 * | 9/2008 | Frenier et al. ................ 507/241 |
| 7,589,050 B2 | 9/2009 | Frenier et al. |
| 2007/0287641 A1 | 12/2007 | Cassidy et al. |
| 2008/0194430 A1 | 8/2008 | Welton et al. |
| 2009/0042748 A1 | 2/2009 | Fuller |

FOREIGN PATENT DOCUMENTS

| | | |
|---|---|---|
| GB | 1559150 A | 1/1980 |
| WO | 03036021 A2 | 5/2003 |

OTHER PUBLICATIONS

PCT Search Report and Written Opinion (PCT/US2011/061392), dated Jun. 5, 2012.
Al-Khaldi, M.H., Nasr-El-Din, H.A. Blauch, M.E. and Funkhouser, G.P., "New Findings on Damage Potential, Geochemical Reaction Mechanisms, and Production Enhancement Applications for Citric Acid," SPE Journal, Sep. 2005, pp. 267-275, Society of Petroleum Engineers, 2005.
Al-Khaldi, M.H., Nasr-El-Din, H.A., Mehta, S. and Al-Aamri, A.D., "Reaction of Citric Acid With Calcite," Chemical Engineering Science, 2007, pp. 5880-6896, 62, Elsevier Ltd., 2007.
Taylor, K.C., Nasr-El-Din, H.A. and Al-Alawi, M.J., "Systematic Study of Iron Control Chemicals Used During Well Stimulation," SPE Journal, Mar. 1999, pp. 19-24, 4 (1), Society of Petroleum Engineers, 1999.

* cited by examiner

*Primary Examiner* — Susannah Chung
*Assistant Examiner* — Atnaf Admasu
(74) *Attorney, Agent, or Firm* — Bracewell & Giuliani LLP; Constance Gall Rhebergen

(57) ABSTRACT

Methods of preventing precipitation of calcium citrate and iron-based scale during acidizing treatments and related compositions are provided as embodiments of the present invention. The acidizing treatment fluid includes citric acid and tetra-salts of EDTA.

17 Claims, No Drawings

METHOD FOR PREVENTING CALCIUM CITRATE PRECIPITATION DURING CITRIC ACID ACIDIZING TREATMENTS

BACKGROUND OF THE INVENTION

1. Field of the Invention

The present invention relates to acidic treatment fluids used in subterranean operations, and more specifically, to acidic treatment fluids including citric acid and salts of ethylene di-amine tetra-acetic (EDTA), and methods of use in subterranean operations.

2. Description of the Related Art

It is a common practice to acidize subterranean formations in order to increase the permeability thereof. For example, in the petroleum industry, it is conventional to inject an acidizing fluid into a well in order to increase the permeability of a surrounding hydrocarbon-bearing formation, thereby facilitating the flow of hydrocarbons into the well from the formation. Such acidizing techniques are generally referred to as "matrix acidizing" treatments.

In matrix acidizing, the acidizing fluid is passed into the formation from the well at a pressure below the breakdown pressure of the formation. In this case, increase in permeability is affected primarily by the chemical reaction of the acid within the formation with little or no permeability increase being due to mechanical disruptions within the formation as in fracturing.

In acidizing treatments, various acid solutions are used to dissolve deposits of calcium compounds in order to increase the permeability of subterranean well formations. For example, hydrochloric acid (HCl), acetic acid, formic acid, and different mixtures of these acids are commonly used. Although hydrochloric acid is the most common used acid, acetic and formic acids are excellent alternatives to HCl in deep hot formations due to their retarded reaction rates.

Citric acid ($C_6H_8O_7$), which is an $\alpha$-hydroxy carboxylic acid with three carboxylic (—COOH), and one hydroxyl (—OH) groups, has been sparingly used as an alternative to common weak acids in acidizing treatments of deep hot reservoirs. Citric acid has been used in methods of acidizing a reservoir while steadily sequestering iron in order to prevent precipitation of different iron scales, such iron sulfide and iron oxide. Compared to HCl acid systems, citric acid is less corrosive to tubulars and can be inhibited by the use of inexpensive corrosion inhibitors, resulting in a cost saving per treatment. One of the main obstacles involved with the use of citric acid, however, is the re-precipitation of calcium ions as calcium citrate, which is the reaction product that has a low solubility in water, when the pH value of reaction solution exceeds 3. This precipitation can reduce the permeability of the treated formation.

Besides calcium citrate, during acidizing treatments, various compounds, such as iron and other metallic compounds, tend to precipitate in the spent acidic treatment fluids. Various types of sequestering additives have been used to alleviate this problem. None of the known additives, however, have been successful at preventing precipitation of calcium citrate during acidizing treatments utilizing citric acid.

A need exists for effective sequestering additives that are capable of simultaneously preventing precipitation of both iron-based compounds and calcium citrate during acidizing treatments. It would be helpful if such additives were effective when used with citric acid based acidizing treatment fluids.

SUMMARY OF THE INVENTION

In view of the foregoing, methods of preventing precipitation of calcium citrate and iron-based scale during acidizing treatments and related compositions are provided as embodiments of the present invention.

For example, as an embodiment, a method of preventing precipitation of calcium citrate during acidizing treatments is provided. In this embodiment, a formation is contacted with an acidizing treatment fluid comprising citric acid and tetra-salts of EDTA. The tetra-salts of EDTA are present in an amount sufficient to prevent formation of calcium citrate precipitation and iron-based scale in the acidizing treatment fluid.

As an embodiment of the present invention, another method of acidizing a subterranean formation is provided. In this embodiment, a sequestering additive is combined with an aqueous citric acid solution to form an acid treatment fluid. The additive is present in an amount sufficient to prevent formation of calcium citrate precipitation and iron-based scale in the acidizing treatment fluid. A formation is then contacted with the acid treatment fluid.

Besides the method embodiment provided herein, compositional embodiments are also provided. For example, as an embodiment, an acid treatment fluid comprising citric acid and tetra-salts of ethylene diamine tetra-acetic acid (EDTA) is provided. The citric acid and the tetra-salts of EDTA are present in a ratio of citric acid to tetra-salts of EDTA that ranges from about 1:1 to about 1:2 to prevent formation of calcium citrate precipitation and iron-based scale in the acid treatment fluid. The acid treatment fluid is suitable for acidizing a formation.

DETAILED DESCRIPTION OF THE DISCLOSURE

Methods of preventing precipitation of calcium citrate and iron-based scale during acidizing treatments and related compositions are provided as embodiments of the present invention. Embodiments of the present invention relate to well treatment processes for acidizing subterranean reservoir formations, and, more particularly, to methods for treating carbonate reservoirs using citric acid whereby calcium citrate precipitation is prevented.

For example, as an embodiment, a method of preventing precipitation of calcium citrate during acidizing treatments is provided. In this embodiment, a formation is contacted with an acidizing treatment fluid comprising citric acid and tetra-salts of EDTA. The tetra-salts of EDTA are present in an amount sufficient to prevent formation of calcium citrate precipitation and iron-based scale in the acidizing treatment fluid.

As an embodiment of the present invention, another method of acidizing a subterranean formation is provided. In this embodiment, a sequestering additive is combined with an aqueous citric acid solution to form an acid treatment fluid. The additive is present in an amount sufficient to prevent formation of calcium citrate precipitation and iron-based scale in the acidizing treatment fluid. A formation is then contacted with the acid treatment fluid.

Besides the method embodiments provided herein, compositional embodiments are also provided. For example, as an embodiment, an acid treatment fluid comprising citric acid and tetra-salts of ethylene diamine tetra-acetic acid (EDTA) is provided. The citric acid and the tetra-salts of EDTA are present in a ratio of citric acid to tetra-salts of EDTA that ranges from about 1:1 to about 1:2 to prevent formation of calcium citrate precipitation and iron-based scale in the acid treatment fluid. The acid treatment fluid is suitable for acidizing a formation.

The amounts of the components contained within the acidizing treatment fluid and that can be used in the acidizing treatments can vary. In as aspect, the citric acid and the tetra-salts of EDTA can be present in a ratio of citric acid to tetra-salts of EDTA that ranges from about 1:1 to about 1:2. Other suitable amounts of each component will be apparent to those of skill in the art and are to be considered within the scope of the present invention.

One of the components of the acidizing treatment fluid is tetra-salts of EDTA. In well acidizing treatments in which citric acid is used as a stand-alone fluid, dissolved calcium ions tend to re-precipitate as calcium citrate when the pH value of the reaction solution exceeds a pH of about 3. This precipitation can be prevented by dissolving a sequestering additive that includes different tetra-salts of ethylene di-amine tetra-acetic acid (EDTA) within the citric acid solution to be injected. The types of tetra-salts that can be used in embodiments of the present invention can vary. For example, the tetra-salts of EDTA can include tetra-sodium EDTA, tetra-potassium EDTA, tetra-ammonium EDTA, or combinations thereof. Other suitable salts of EDTA will be apparent to those of skill in the art and are to be considered within the scope of the present invention.

The methods and compositions of the present invention can be used in various types of formations. The methods and compositions of the present invention are particularly effective in carbonate formations. Other types of formations in which the methods and compositions of the present invention can be used will be apparent to those of skill in the art and are to be considered within the scope of the present invention.

In embodiments of the present invention, the acidizing treatment fluid can include water. The amount of water can vary, depending upon conditions of the acidizing treatment, as will be understood by those of skill in the art. When water is present, it is generally present in a molar ratio about 1:1 to about 1:2 molar ratio of acid to water. Other suitable amounts of water than can be used in embodiments of the present invention will be apparent to those of skill in the art and are to be considered within the scope of the present invention.

In an aspect, the acidizing treatment fluid of the present invention can also include other types of acids useful in acidizing treatments. For example, the acidizing treatment fluid can also include hydrochloric acid (HCl), acetic acid, formic acid, or combinations thereof. Other suitable acids that can be used in embodiments of the present invention will be apparent to those of skill in the art and are to be considered within the scope of the present invention.

The methods and compositions of the present invention can be used in formations having a variety of operational conditions. For example, the methods and compositions of the present invention can be used in a variety of temperatures. In an aspect, the step of contacting the formation with the acidizing treatment fluid occurs in a temperature range up to about 300° F. (149° C.). Besides a wide temperature range, the contact time in which the compositions are used can also be varied. For example, the step of contacting the formation with the acidizing treatment fluid can occur in a contact time that ranges from about one hour to several hours; or alternatively, from about one hour to about eight hours. Other process conditions that can be varied will be apparent to those of skill in the art and are to be considered within the scope of the present invention.

EXAMPLE

As indicated previously and as can be seen in Table 1, when using citric acid alone, calcium citrate precipitates. When tetra-salts of EDTA, such as tetra-sodium EDTA, are added to citric acid, there is unexpectedly no calcium citrate precipitation.

TABLE 1

| Reactive Fluid | Amount of Calcium Carbonate added, g | Precipitation of calcium citrate |
| --- | --- | --- |
| 0.026M Citric Acid | 4 | Yes, white precipitate |
| 0.026M Tetra-Sodium EDTA | (no dissolving power) | NA |
| 0.026M citric acid + 0.026 Tetra-Sodium EDTA | 8 | No precipitation |

It is well documented that calcium citrate precipitates when citric acid is used for acidizing treatments. Using embodiments of the present invention allows users to use citric acid without the typical problems associated with precipitation of calcium citrate in the spent acid solution.

Besides controlling precipitation of calcium citrate, the methods and compositions of the present invention also prevent the formation of iron-based scale in the acidizing treatment fluid. Use of the methods and compositions of the present invention can alleviate the need for additional corrosion inhibitors that would typically be needed.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A method of preventing precipitation of both calcium citrate and iron-based scale during acidizing treatments of a formation, the method comprising the steps of:
    contacting a formation with a fluid comprising an acidizing treatment fluid, where the acidizing treatment fluid consists essentially of citric acid and tetra-salts of EDTA, where the tetra-salts of EDTA are present in an amount sufficient to prevent the precipitation of both calcium citrate and iron-based scale in the fluid during acidizing treatment of the formation with the acidizing treatment fluid, and where the acidizing treatment fluid contacts the formation with a molar ratio of citric acid to tetra-salts of EDTA in a range of from 1:1 to 1:2.

2. The method of claim 1, wherein the tetra-salts of EDTA are selected from the group consisting of tetra-sodium EDTA, tetra-potassium EDTA, tetra-ammonium EDTA, and combinations thereof.

3. The method of claim 1, wherein the formation comprises a carbonate formation.

4. The method of claim 1, wherein the fluid further comprises water, the water being present in a molar ratio about 1:1 to about 1:2 molar ratio of acid to water.

5. The method of claim 1, wherein the step of contacting the formation with the acidizing treatment fluid occurs in a temperature range up to about 300° F. (149° C.) and in a contact time range of about one hour to about eight hours.

6. The method of claim 1, wherein the fluid further comprises an acid selected from the group consisting of hydrochloric acid (HC1), acetic acid, formic acid, and combinations thereof, where the acid and the acidizing treatment fluid are mixed together.

7. A method of acidizing a subterranean carbonate formation, the method comprising the steps of:
   a. combining a sequestering additive with an aqueous citric acid solution into an acid treatment fluid, where the acid treatment fluid consists essentially of the sequestering additive and the aqueous citric acid and where the aqueous citric acid and the sequestering additive are in a molar ratio of citric acid to sequestering additive in a range of from 1:1 to 1:2, which is an amount sufficient to prevent formation of calcium citrate precipitation and iron-based scale in a fluid contacting the subterranean carbonate formation; and
   b. contacting the subterranean carbonate formation with the fluid, where the fluid comprises the acid treatment fluid.

8. The method of claim 7, wherein the sequestering additive is a tetra-salts of EDTA.

9. The method of claim 8, wherein the tetra-salts of EDTA are selected from a group consisting of tetra-sodium EDTA, tetra-potassium EDTA, tetra-ammonium EDTA, and combinations thereof.

10. The method of claim 7, wherein the aqueous citric acid having a molar ratio ranging from about 1:1 to about 1:2 molar ratio of acid to water.

11. The method of claim 7, wherein the step of contacting the subterranean carbonate formation with the acidizing treatment fluid occurs in a temperature range up to 300° F. (149° C.) and in a contact time range of from one hour to eight hours.

12. The method of claim 7, wherein the fluid further comprises an acid selected from the group consisting of hydrochloric acid (HCl), acetic acid, formic acid, and combinations thereof, where the acid and the acidizing treatment fluid are mixed together.

13. A fluid comprising an acid treatment fluid suitable for acidizing a carbonate formation consisting essentially of citric acid and tetra-salts of ethylene diamine tetra-acetic acid (EDTA), where the citric acid and the tetra-salts of EDTA are present in a molar ratio of citric acid to tetra-salts of EDTA in a range of from 1:1 to 1:2, and where the formation of both calcium citrate precipitation and iron-based scale in the acid treatment fluid upon contacting the carbonate formation is prevented.

14. The fluid of claim 13, wherein the tetra-salts of EDTA are selected from a group consisting of tetra-sodium EDTA, tetra-potassium EDTA, tetra-ammonium EDTA, and combinations thereof.

15. The fluid of claim 13 further comprising water, the water being present in a molar ratio of about 1:1 to about 1:2 molar ratio of acid to water.

16. The fluid of claim 13 further comprising an acid selected from the group consisting of hydrochloric acid (HCl), acetic acid, formic acid, and combinations thereof.

17. The method of claim 6 where the acid mixes with the acidizing treatment fluid while the fluid is in contact with the carbonate formation.

* * * * *